(12) United States Patent
Michaud

(10) Patent No.: US 7,086,823 B2
(45) Date of Patent: *Aug. 8, 2006

(54) ATMOSPHERIC VORTEX ENGINE

(75) Inventor: Louis Marc Michaud, Sarnia (CA)

(73) Assignee: Louis M Michaud, Sarnia (CA)

( * ) Notice: Subject to any disclaimer, the term of this patent is extended or adjusted under 35 U.S.C. 154(b) by 8 days.

This patent is subject to a terminal disclaimer.

(21) Appl. No.: 10/471,672

(22) PCT Filed: Sep. 19, 2001

(86) PCT No.: PCT/CA01/01310

§ 371 (c)(1),
(2), (4) Date: Sep. 11, 2003

(87) PCT Pub. No.: WO03/025395

PCT Pub. Date: Mar. 27, 2003

(65) Prior Publication Data

US 2004/0112055 A1    Jun. 17, 2004

(51) Int. Cl.
*F03D 7/06* (2006.01)
(52) U.S. Cl. .................... 415/4.2; 415/4.4; 415/909
(58) Field of Classification Search ............. 415/4.1, 415/4.2, 4.4, 909; 290/55, 44
See application file for complete search history.

(56) References Cited

U.S. PATENT DOCUMENTS 3,936,652 A    2/1976 Levine (Continued)

FOREIGN PATENT DOCUMENTS

AU    6 562 801 A    3/2002

(Continued)

OTHER PUBLICATIONS

Michaud, L.M., Proposal for the use of a controlled tornado-like vortex to capture the mechanical energy produced in the atmosphere from solar energy. Bulletin of the American Meteorological Society. 1975, vol. 56, pp. 530-534.

(Continued)

*Primary Examiner*—Edward K. Look
*Assistant Examiner*—Dwayne J White

(57) ABSTRACT

The invention describes an Atmospheric Vortex Engine in which a tornado-like convective vortex (37) is produced by admitting air tangentially in the base of a cylindrical wall (1). The vortex is started by heating the air within the circular wall (1) with fuel (83). The heat required to sustain the vortex once established can be the naturally occurring heat content of ambient air or can be provided in a peripheral heat exchanger mean (61) located outside the circular wall. The heat source for the peripheral exchanger mean can be waste industrial heat or warm sea water. The preferred heat exchange mean is a crossflow wet cooling tower (61). The mechanical energy is produced in a plurality of peripheral turbines (21). A vortex engine could have a diameter of 400 m; the vortex could be 100 m in diameter at its base and extend to a height of 1 to 15 km; the power output could be in the 100 to 500 MW range. The vortex process could also be used to produce precipitation to cool the environment, or to clean or elevate polluted surface air.

31 Claims, 3 Drawing Sheets

U.S. PATENT DOCUMENTS

| | | | |
|---|---|---|---|
| 4,018,543 A * | 4/1977 | Carson et al. | 415/208.2 |
| 4,070,131 A | 1/1978 | Yen | |
| 4,157,368 A | 6/1979 | Fernandes | |
| 4,275,309 A | 6/1981 | Lucier | |
| 4,391,099 A | 7/1983 | Sorensen | |
| 4,397,793 A | 8/1983 | Stillman et al. | |
| 4,499,034 A | 2/1985 | McAllister, Jr. | |
| 5,483,798 A | 1/1996 | Prueitt | |
| 6,772,593 B1 * | 8/2004 | Dunn | 60/641.11 |

FOREIGN PATENT DOCUMENTS

| | | |
|---|---|---|
| FR | 2588317 A1 * | 4/1987 |
| GB | 1 231 582 A | 5/1971 |
| GB | 2 261 705 A | 5/1993 |
| GB | 2 302 139 A | 1/1997 |
| JP | 57206781 A * | 12/1982 |
| WO | WO 95 16858 A | 6/1995 |
| WO | WO 00 42320 A | 7/2000 |

OTHER PUBLICATIONS

Michaud, L.M., Entrainment and detrainment required to explain updraft properties and work dissipation. Tellus, 1998, vol. 50A, pp. 241-251.

Michaud, L.M. Vortex process for capturing mechanical during upward heat convection in the atmosphere. Applied Energy, 1999. vol. 62/4, pp. 241-251.

Michaud, L.M. Thermodynamic cycle of the atmospheric upward heat convection process. Meterology and Atmospheric Physics, 2000, vol. 72, pp. 29-46.

Michaud, L.M. Total energy equation method for calculating hurricane intensity. Meterology and Atmospheric Physics, 2001, vol. 78, issue 1/2, pp. 35-43.

Byram, G.M., and Martin, R.E. Fire whirl in the laboratory. Fire Control Notes, 1962, US Fire service.

Mullett, L.B. The solar chimney overall efficiency, design and performance. International Journal of Ambient Energy, 1987, vol. 8(1), pp. 35-40.

* cited by examiner

ATMOSPHERIC VORTEX ENGINE

BACKGROUND OF THE INVENTION

FIELD OF INVENTION

The atmospheric vortex engines has applications in several fields. The invention could produce a large quantity of mechanical energy from solar energy, from naturally occurring heat sources, or from waste heat. The invention depends on differences of elevation and works on the principle that work can be produced when heat is transported upwards by convection. The vortex engine could enhance the power output of thermal power plants by producing mechanical energy in cooling towers and could also improve the efficiency of the conventional part of the power plant by reducing cooling water temperature. The vortex engine is a major improvement on conventional waste heat disposal systems, and its initial use could be to replace conventional cooling towers with superior devices. The improvement in the efficiency of the combined cycle is the result of reducing the temperature of the cold sink from the temperature at the bottom of the atmosphere, typically 30 C, to the average temperature at which the troposphere radiates to space, typically −20 C. In the meteorology field, the atmospheric vortex engine could be used to enhance precipitation, to reduce surface temperature, to reduce instability and severity of storm, to reduce pollution by washing or lifting surface air, or to alleviate global warming by expediting upward heat transport and by reducing fossil fuel consumption.

References Cited

| | | | |
|---|---|---|---|
| 4,070,131 | 1/1978 | Yen | 415/3 |
| 4,275,309 | 6/1981 | Lucier | 290/1R |
| 4,391,099 | 6/1983 | Sorensen | 60/641.6 |

International Patent Application

PCTAU99/00037  January 1999  Louat

Other Publications

Byram, G. M. and Martin, R. E, 1962: Fire whirl in the laboratory. Fire Control Notes, U.S. Fire Service.

Michaud, L. M., 1975: Proposal for the use of a controlled tornado-like vortex to capture the mechanical energy produced in the atmosphere from solar energy. Bull. Amer. Meteor. Soc., 56: 530–534.

Michaud, L. M., 1998: Entrainment and detrainment required to explain updraft properties and work dissipation. Tellus, 50A, 283–301.

Michaud, L. M., 1999: Vortex process for capturing mechanical energy during upward heat-convection in the atmosphere. Applied Energy, 62/4, 241–251.

Michaud, L. M., 2000: Thermodynamic cycle of the atmospheric upward heat convection process. Meteorol. Atmos. Phys. 72, 29–46.

Michaud, L. M., 2001: Total energy equation method for calculating hurricane intensity. Meteorol. Atmos. Phys. 78, Issue 1/2, 35–43.

Mullett, L. B., 1987: The solar chimney overall efficiency, design and performance. International Journal of Ambient Energy, 8(1), 35–40.

SUMMARY OF THE INVENTION

The invention describes an Atmospheric Vortex Engine in which a controlled convective vortex is produced by admitting air tangentially in the base of a cylindrical wall. Naturally occurring convective vortices include dust-devils, tornadoes, water spouts, and hurricanes. The size of a controlled vortex could range from a large dust-devil to a small tornado. The vortex is started by heating the air within the circular wall with fuel. The heat required to sustain the vortex once established can be the naturally occurring heat content of ambient air or can be provided in a peripheral heat exchanger mean located outside the circular wall. The heat source for the peripheral exchanger mean can be waste industrial heat or warm sea water. The preferred heat exchange mean is a crossflow wet cooling tower. The mechanical energy is produced in a plurality of peripheral turbines.

The cylindrical wall could be 50 to 500 m in diameter and 50 to 150 m high. The diameter of the vortex at its radius of maximum tangential velocity at ground level, the eyewall diameter, could be a half to a quarter of the diameter of the circle of deflectors. The vortex could extend to a height of up to 15 km. The power output of a 300 m diameter station could be in the 100. to 500 MW range.

An vortex cooling tower could increase the electrical output of a thermal 500 MW thermal power plant from 500 to 700 MW by converting 20% of its 1000 MW of waste heat to work and increase the power output of a power plant by up to 40%. The power output could be larger when the ambient has instability and smaller when the atmosphere is stable. The chimney effect of the vortex would extend higher than the chimney effect of a natural draft cooling tower even when the atmosphere is stable.

Prior Art Without Vortex

U.S. Pat. No. 4,275,309, Lucier 1981, describes a solar energy system consisting of a chimney located in the center of a transparent solar collector. A solar chimney power plant similar to the one described in Lucier's patent, was built in Manzanares Spain in the 1980's. The Manzanares plant had a chimney 200 m high by 10 m in diameter located at the center of a solar collector 200 m in diameter; the turbine was located in the base of the chimney. The plant operated successfully for 7 years and had a power output of 50 kw, see Mullett (1987).

There are two major problems with the solar chimney: the chimney has to be very high to achieve significant heat to work conversion efficiency and a solar collector with a transparent roof has to cover a large area. Sorensen realised the height difficulty and proposed using an inflatable pressurized rising conduit suspended from a buoyant balloon, U.S. Pat. No. 4,391,099.

Prior Art with Vortex

Louat's, international patent application PCT/AU99/00037, replaced the physical chimney an unbounded vortical chimney. In the Louat patent application, the air is deflected tangentially as it enters the circular heat collector with the transparent roof, and exits the collector as a vortex via a central opening in which the turbine is located. The Louat system eliminates the need for the physical chimney, but the transparent collector is still required and the power production is limited by the area of the collector. The Louat system has several shortcomings and the embodiment described by Louat may not be practical. There is no means of preventing the vortex from wandering; the fragile transparent roof is located next to the vortex where it could easily be damaged; the turbine in the central opening could adversely affect the formation of the vortex; establishing a strong vortex without artificial heating may not be practical.

Louat's application states: "In a smoke stack, the pressure, at the same height, of the air moving inside is lower than that of still air outside by an amount that increases steadily with the distance from the top of the stack. Thus, the wall of the stack acts as a barrier, that is to say it provides a force which acts to prevent the inward flow of air . . . . Crucial to the operation of the engine is the fact that the barrier to this inward flow need not be material but can be provided through the centrifugal force associated with rotation." Michaud (1975) wrote: "The operation of a natural draft chimney depends on the fact that a chimney is a cylinder in radial compression which prevents convergence in the horizontal plane in spite of the fact that at a given level the pressure is less inside than outside . . . . The centrifugal force produced by the rotation of a mass of air can prevent horizontal convergence just as well as the solid wall of a chimney". The concept of replacing the physical chimney with a vortex was described by Michaud prior to Louat's application. Michaud (1998) showed that, without a tube or a vortex, lateral entrainment rapidly reduces the buoyancy of rising air.

The vortex power station shown in FIG. 1 of Michaud (1975) is closer to the present invention than the Louat application. Louat and Michaud both realized the possibility of replacing the physical chimney with a vortex, but the mechanism described in Louats application was not an improvement on system previously described by Michaud in 1975.

The solar chimney, the unbounded vortical chimney, and the vortex engine have the same thermodynamic basis. This thermodynamic basis is essentially the same as that of tornadoes, dust devils, waterspouts, hurricanes and firewhirls. Upward heat convection is responsible for producing circulation in numerous industrial processes including: boilers, reboilers, natural draft chimneys, and natural draft cooling towers.

Yen, U.S. Pat. No. 4,070,131, proposed a tornado-type power system where the energy of the vortex is derived from the kinetic energy of wind entering tangentially in the side in a tall vertical circular tower. Yen's patent is not relevant because it is not based on thermodynamic conversion of heat to work during upward heat convection.

Prior Art by the Inventor

Michaud (1975) realized that the heat content of surface air can be sufficient to produce work when air is raised, and that this upward heat convection process is the source of the energy of tornadoes. Michaud tried to interest atmospheric scientists in the energy production possibility of the tornado process in several peer reviewed articles published mainly in meteorological journals.

Michaud (1975, 1999) proposed using heat from a fire to start the vortex and using either tangential entry deflectors or a rotating screen to give the converging air circulation. Michaud (1998, 1999, 2000, and 2001) developed the thermodynamic basic of the process, pointed out the huge energy production potential of the process, and need for development work.

New Elements Not Previously Disclosed

The purpose of this patent specification is to protect specific embodiments not previously disclosed in order to make developing the process financialy attractive. The concept of using a convective vortex to replace a physical chimney was placed in the public domain by the inventor, this patent covers specific embodiments not yet in the public domain.

New mechanism described in this patent and not revealed in the prior disclosures include:
   the use of a cylindrical wall significantly higher than the tangential entries of its base,
   the use of a heat exchange mean upstream of the tangential deflectors,
   the use of waste heat or warm seawater to heat the air and enhance energy production,
   the use of tangential entry deflectors preceded by adjustable restrictors,
   the use of peripheral turbines,
   the use of two levels of deflectors to permit independent control of tangential velocity in the bottom layer and the layer immediately above.
   The use of combinations of fixed deflectors to control the circulation of the converging air.

The concept of using a cylindrical wall 5 to 30 times higher than the deflectors located in the base of the wall is a key feature of this patent. The wall acts as a short chimney producing enough differential pressure to get the vortex started. The wall prevents air from entering the vortex without going through the deflectors and prevents the vortex from drifting away as a result of horizontal wind. The wall makes it possible to control of the vortex by adjusting the angle of entry of the air with deflectors and the quantity of air entering the station with adjustable restrictors. The vortex intensity can be reduced by orienting the deflectors in the radial direction and restricting the flow. The area of the tangential entry openings is small relative to the area of the cylinder. Tangential entries a few meters high could be sufficient for a vortex engine with a circular wall 300 m in diameter by 80 m high.

The concept of using a lower layer of air with little rotation and an upper layer air with higher rotation is another important novel feature. The rotation of the upper layer is responsible for producing the centrifugal force which prevents entry of ambient air into the vortex above the cylindrical wall; the relative absence of rotation in the bottom layer eliminates centritugal force in the bottom layer and lets surface air converge into the base of the vortex without being opposed by centrifugal force. As a result of the absence of centrifugal force in the bottom layer, the pressure at the turbine outlet approaches the pressure at the eyewall of the vote The difference in pressure between ambient air and the turbine outlet pressure is used to drive the turbines and to produce the work. Movies of tornadoes occasionally show a layer of dust hugging the ground and rushing into the base of the vortex.

Firewhirls are common in large fires. Large fires have occasionally started tornadoes: San Luis Obispo Calif. tank farm fire, Hamburg bombing and others: Laboratory firewhirls are produced using vertical cylindrical enclosures with a few lone vertical tangential entry slots in their side, Byram and Martin (1962). The inventor built a physical model using a vertical cylinder 50 cm in diameter by 60 cm high with fixed tangential entries 5 cm high at the tube base. An intense vortex was produced by burning a small amount of gasoline spread on the concrete base on which the model was placed. A firewhirl generator with a ring of short tangential entries at the bottom of the cylindrical wall is an improvement over a firewhirl generator with long vertical tangential entries.

The cylindrical wall concept separates the chimney mean from the heat collection mean. The collector could be a solar pond located at a distance from the vortex. The energy produced as a result of increasing the effective height of the chimney would be more than make up for the energy required to pump brine up to the top of the cooling tower.

Replacing the physical tube with a vortex opens the possibility of increasing the height of the chimney effect from 200 m to 15000 m or more. The air rising in the vortex behaves like a spinning top; friction would reduce the rotation of a massive top very slowly. The spinning rising air would lose little of its rotational inertia in the 30 minutes or so required for the air to rise from the surface to its level of neutral buoyancy. In addition, the kinetic energy of the spiraling air is recovered at the top of the vortex as the vortex diverges.

The heat content of the air at the bottom of the atmosphere is often sufficient to sustain a vortex and can be supplemented with waste heat from power plant or with warm sea water. Wet cooling towers are the preferred heat exchange mean; they widely used in power plants because they are ideally suited for transferring waste heat from water to air.

Thermodynamic Basis a. Work Production During Upward Heat Convection

The atmosphere is heated from the bottom and cooled from the top because it is transparent to short wave solar radiation and opaque to long wave radiation. Heat is transported upward by convection and mechanical energy is produced during the upward heat convection process because the work produced by the expansion of heated air is greater than the work required to compress the same air after it has been cooled. The upward heat flux at the bottom of the atmosphere averages 100 to 150 W/m$^2$. The average temperature at which the heat is received at the bottom of the atmosphere is about 20 C.; the average temperature at which heat is given up by the atmosphere averages about −20 C., the average temperature at which the troposphere radiates to space. The fraction of the heat carried upward which is converted to work is determined by Carnot efficiency ($n_c$) which is equal to $n_c=1-T_c/T_h$, where $T_h$ and $T_c$ are the temperatures of the hot and cold sources respectively, in degrees Kelvin. The average heat to work conversion efficiency for heat carried upward in the atmosphere is approximately 15%. The efficiency is essentially independent of whether the heat is carried upward as sensible or latent heat. In the absence of a mechanism to capture the mechanical energy, the mechanical energy dissipates and reverts to heat.

b. Work Production when a Mass of Air is Raised

The work produced when a unit mass of air is raised to its level of neutral buoyancy is known in meteorology as Convection Available Potential Energy (CAPE). In tropical oceanic areas CAPE is usually between 800 and 1800 J/kg. In continental areas CAPE can be as high as 4000 J/kg during periods of insolation; CAPE can be negative during stable periods with low insolation.

CAPE is defined as the work produced when air with the average properties of the bottom 500 m of the atmosphere is raised to its level of neutral buoyancy. The term convective energy (CE) will be used to describe the work produced when any unit mass of air is raised to any level to avoid conflicts with the rigid CAPE definition. The CE of surface air is at a maximum when it is raised up to its level of neutral buoyancy, which is usually near the top of the troposphere. The maximum CE of surface air is usually slightly higher than CAPE because the enthalpy of surface air is usually higher than the average enthalpy of the bottom 500 m of the atmosphere. A CE of 1000 J/kg corresponds to the energy which can be produced when a kilogram of water is lowered 100 m; there is an abundance of air at the bottom of the atmosphere whose CE is 1000 J/kg or higher.

CE is often negative up to the level of free convection, which is usually 500 to 1500 m high. Beyond the level of free convection, CE increase gradually with height reaching a maximum at the level of neutral buoyancy which usually around 10 to 15 km. Surface air is frequently in a metastable state wherein a small quantity of mechanical energy is required to raise the air to the level of free convection and wherein a much larger quantity of energy is produced as the air rises from the level of free convection to the level of neutral buoyancy. The process is analogous to a syphon; a small quantity of energy must be provided to release a much larger quantity of energy. Transmitting the energy produced in the upper part of the lifting process downward requires a leak tight tube. Adding heat to the air at the bottom of the atmosphere increases its buoyancy and reduces the level of free convection. For air which rises its level of neutral buoyancy, the increase in the CE as a result of heat addition is typically 15 to 30% of the added heat, whether the heat is added as sensible or latent heat.

CE is equal to the decrease in the enthalpy of air raised isentropically minus the increase in the potential energy of the same air.

$$CE = -\Delta h - \Delta gz$$

which is a form of the well known total energy equation, where $-\Delta h$ is the change in the enthalpy of the raised air, and where $-\Delta gz$ is the change in potential energy of the raised air. The troposphere is the earth's ultimate heat sink; rejecting waste heat to the upper troposphere has the potential of reducing the cold source temperature of a thermal power plant from 30 C. to −20 C. and of increasing the efficiency of the power plant.

The cold source temperature depends on the height to which the air is raised. The theoretical efficiency of the solar chimney is, n=0.033 z, where n is the efficiency and z is the height in kilometers, Mullett (1987). The theoretical efficiency of the 200-m Manzanares solar chimney was 0.16%. The work produced in the Manzanares solar chimney was 0.16% of the heat received. The solar collector increased the air temperature by 20 C.; the heat received was therefore 20000 J/kg. The work produced was 130 J/kg of which 70 J/kg was extracted by the turbine. The power output of 50 kw is simply the product of the work extracted per unit mass by the flow: 50 kw=60 J/kg×833 kg/s, Michaud (1999). Increasing the height of the chimney by a factor of 50 would increase its efficiency from 0.1% to 5%; increasing the diameter of chimney from 10 to 50 m would increase the flow by 25 fold; the combined effect could increase the power output by a factor of 1250 increasing the power output from 50 kW to 62 MW.

Michaud (1999; 2000, and 2001) explained the thermodynamic cycle of the atmosphere and described methods for calculating the work produced per unit mass of air raised; the theory is directly applicable to the vortex engine. A more complete explanation of the energy conversion process can be found in the cited articles.

DRAWING LIST

FIG. 1 Basic vortex engine consisting of a circular wall with tangential entry slots at its base, plan view.

FIG. 2 Basic vortex engine consisting of a circular wall with tangential entry slots at its base, elevation view.

FIG. 3 Preferred embodiment, vortex engine with peripheral air heater consisting of crossflow cooling tower with turbines in the cooling tower inlet, plan view.

FIG. 4 Preferred embodiment, vortex engine with peripheral air heater consisting of crossflow cooling tower with turbines in the cooling tower inlet, elevation view.

FIG. 5 Vortex engine without the heat exchange mean, plan view.

FIG. 6 Vortex engine without the heat exchange mean, elevation view.

The functional terms: "restrictors and deflectors" will be used to avoid confusion with the terms: "vanes, louvers and dampers". Restrictors and deflectors can both be made up of vanes. Restrictors, commonly called dampers, have vanes that rotate in alternate direction to restrict flow without affecting its direction. Deflectors vanes can be adjustable or fixed; they can be straight or can have an air foil shape. To produce tangential velocity about the vertical axis, deflector vanes must be vertical and adjustable deflector vanes must be rotatable about the vertical axis. Adjustable vanes can be adjusted manually or remotely. Vanes can be linked together so that one actuating arm can adjust many vanes. The flow direction can be altered by either rotating the whole deflector or just the tip of the deflector. Restrictor vanes should be installed horizontally to prevent the restrictor from affecting tangential velocity. Remotely adjustable deflectors are very costly, therefore fixed deflectors would be used unless deflector adjustment is essential. Manually adjustable deflectors are less costly than remotely adjustable deflectors and would be used where appropriate.

Deflector can act as restrictor because changing their orientation affects the angle of entry of the air in the arena and also changes the size of the slot bet deflectors. Restricting the flow by reducing the size of the slot between deflectors would increase tangential velocity and would not be as effective as using separate restrictors and deflectors.

Figure 1:
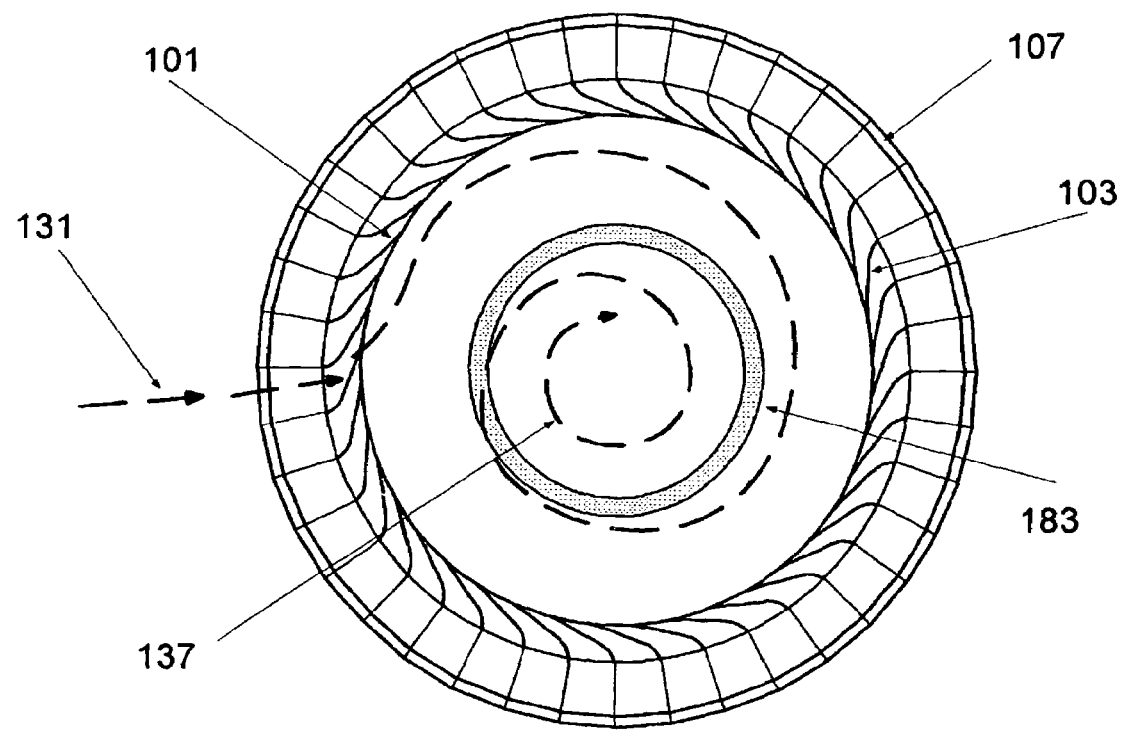
FIGS. 1 and 2 show the basic Atmospheric Vortex Engine consisting of a vertical cylindrical wall 101, with a plurality of tangentially oriented entry slots at its base, the slots are separated by a plurality of adjustable deflector vanes 103. The complete vortex generator is called "the station" while the volume within the cylindrical wall 102 is called "the arena". The direction at which the air enters into the arena is depends on the orientation of the deflector vanes 103. The height of the deflectors is in the order of one twentieth of the height of the circular wall. The convective vortex is started by burning fuel inside the arena in a ring of burners 183. The quantity of air entering the vortex is controlled by adjustable restrictors vanes 107. The restrictors and deflectors are shown oversize in FIG. 1 for clarity, a real vortex station would have a larger number of smaller restrictors and deflectors. The air 131 converging towards the base of the station is deflected tangentially as it passes between the deflector vanes 103, the airs tangential component of velocity increases to conserve angular momentum as the air converges towards the center of rotation; and the air then rises in a vortex 137 near the center of the station.
Figure 2:
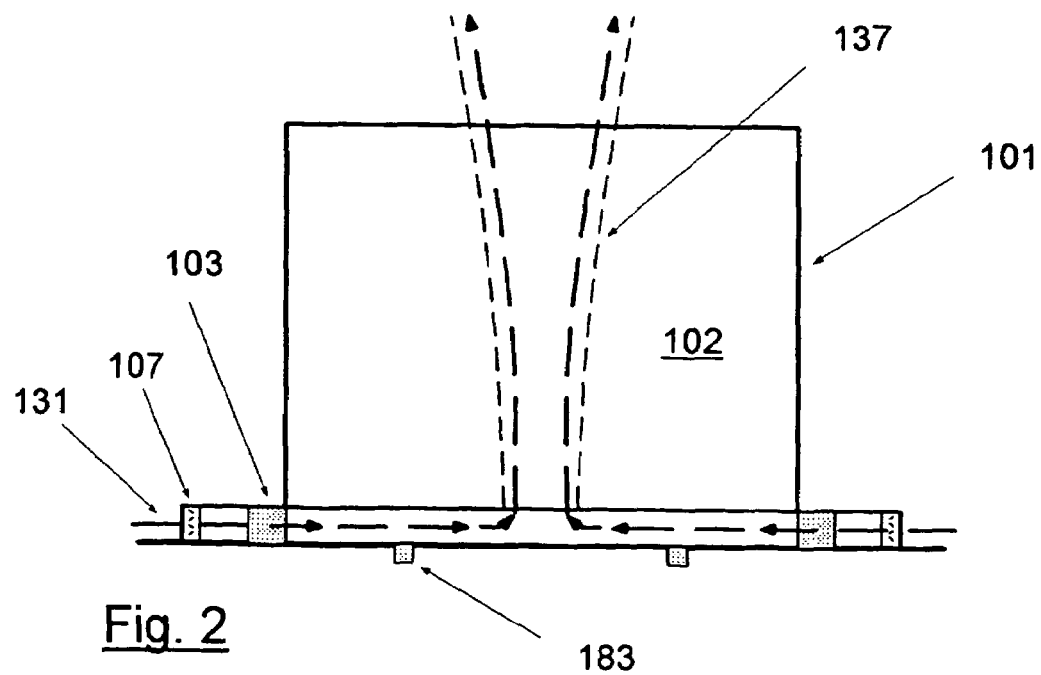
Figure 3:
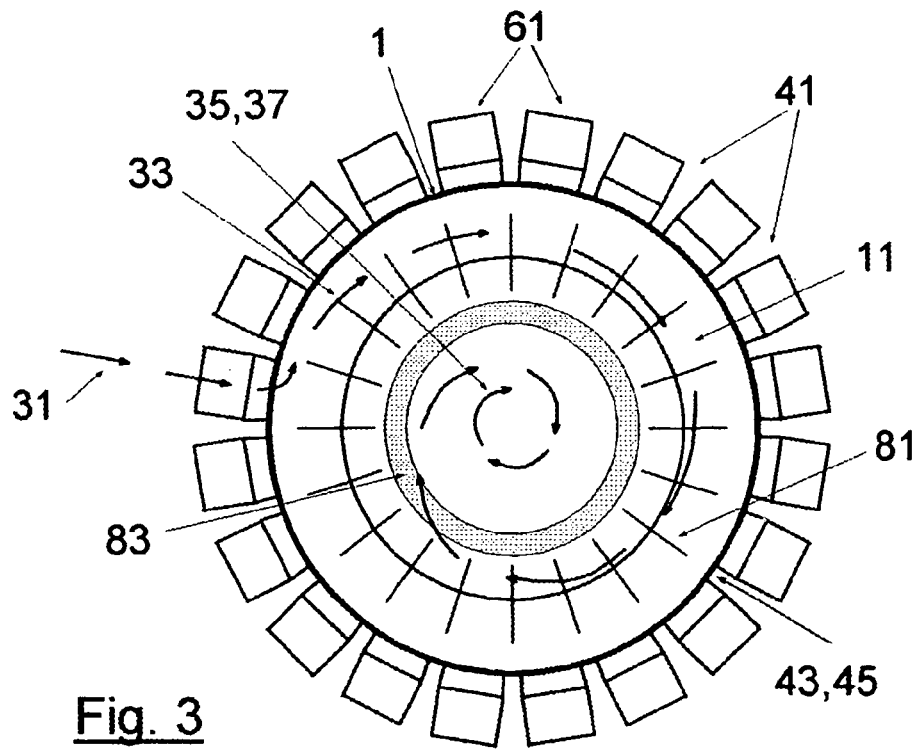
Figure 4:
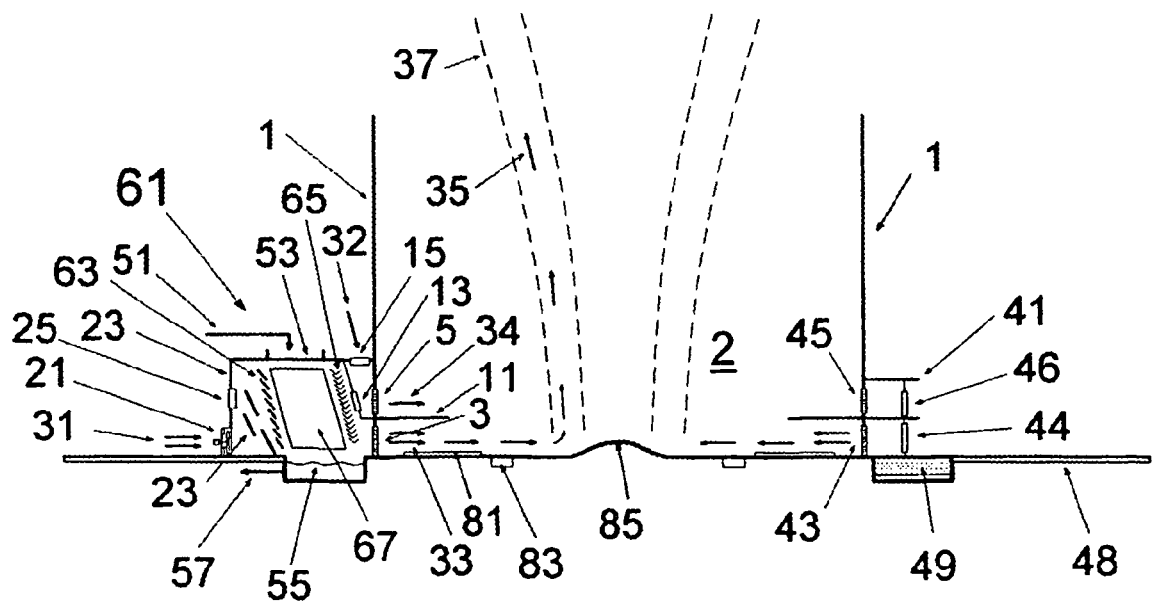

FIGS. 3 and 4 shows the preferred embodiment of the Atmospheric Vortex Engine complete with peripheral air heater consisting of crossflow cooling tower 61, and with turbines 21 in the air inlets to the cooling tower. The arena 2 is surrounded by a strong impermeable cylindrical wall 1. The cylindrical wall is smooth on the inside and can have a support structure on the outside. The station has a concrete base 48; a concrete cooling tower basin 55, and a concrete floor and can have a hump in the center of the station 85. The circular wall is surrounded by a plurality of crossflow cooling tower bays 61. The two sets of deflectors at the base of the circular wall 3 and 5 serve as the air outlet for the cooling tower and as tangential air entry into the arena. The air supply to the lower set of deflectors 3 comes from the cooling tower 61. The air supply to the upper set of deflector can come from the cooling tower via restrictor 13 or can be unheated ambient air entering via restrictor 15. The height of deflectors 3 and 5 are exaggerated in FIG. 4 for clarity. In an actual station, deflectors 3 and 5 could be 2 to 4 meters high, while the height of the cooling tower bay 61 and of circular wall 1 could be 30 m and 80 m respectively.

The cooling tower 61 serves as the heat sink for the thermal power plant and as heat source for the atmospheric vortex engine. The cooling tower 61 is similar to a conventional crossflow cooling tower complete with cooled water collection basin 55, inlet hot water distributor 53, inlet louvers 63, mist eliminator 65, and inverted "vee" or high efficiency fill 67. The cooled water would be pumped out of the basin via cooled water outlet 57 typically via a submersible pump installed in a sump connected to basin 55. Warm water is returned to the cooling tower water distributor pan 53 via hot water inlet pipe 51. The construction of the cooling tower will be familiar to those familiar with the cooling tower art; each cooling bay 61 is equivalent to half of a conventional crossflow cooling tower. The cooling bays differ from conventional crossflow cooling tower in that the air outlet is via deflectors 3 and 5 instead of via an induced draft fan located at the top of the cooling tower and in that the air inlet is via turbine 21. Entry of air into the cooling tower other than via turbine 21 is prevented by an air tight enclosure 23 which is not needed in conventional cooling towers. The cooling tower has to be air tight and strong enough to withstand the compressive force because the pressure in the cooling tower could be 5 to 15 kPa below ambient pressure. The pressure reduction at the base of the vortex is transferred to the cooling tower, the differential pressure at the cooling tower inlet drives the turbines to produce mechanical energy. The lateral walls between cooling bays extend down in the cooling water basin 55 to form a seal 49 and prevent air exchange between bays.

Turbine 21 can consist of a rotating blades with or without adjustable inlet nozzles. During operation, the turbines are the main restriction to the air flow. In turbines with inlet nozzles, the flow through the turbine can be increased by increasing either the number or the size of the inlet nozzles In turbines without inlet nozzles the electrical load on the turbine could be manipulated to control air flow. People skilled in the turbine art would determine the most appropriate turbine type and arrangement. In a turbine with inlet nozzles, the differential pressure across the nozzle accelerates the air giving it kinetic energy; the rotating turbine blades located immediately downstream of the nozzles capture the kinetic energy of the air coming out of the nozzles. The turbine inlet nozzles thus act as both a restriction in the air inlet to the turbine and as a restriction in the air flow to the cooling tower and permit restricting the flow so that the cooling tower can be operated at sub-atmospheric pressure.

Adjustable turbine bypass restrictor 25, located in parallel with turbine 61, permits operating the cooling tower without using the turbine or can be used to supplement the air flow in the cooling tower during startup when the draft is too small to get sufficient flow via the turbines.

The velocity of the air in the cooling tower must be kept under approximately 3 m/s to prevent damaging the fill. The cross-sectional areas of turbines 21 or outlet deflectors 3 and 5 are much smaller than the cross-sectional area of the fill 67 to keep the velocity in the fill low. The purpose of diffusers 23 is to reduce the velocity at the turbine outlet and to distribute the air evenly to the fill. The diffuser 23 located downstream of the cooling tower inlet could consist of solid panels or of perforated screens. The velocity of the air at the outlet of the turbine inlet nozzle could be 40 to 80 m/s. The velocity of the air entering arena 2 at the outlet of lower deflector 3 could be 10 to 30 m/s.

The cooling bays 61 are separated by radial passageways 41 which can be used to admit unheated ambient inside the circular wall via deflectors 143, 145 and restrictors 144 146. Restrictors 144 and 146 could be replaced with turbines and used to produce energy in addition to the energy produced by the turbines located in the cooling tower inlets. Some of passageways 41 may be used simply for gaining access to the center of the station; access passageways would require air locks consisting of double air tight doors. The inter-bay passageways may not be essential and could be eliminated or reduced in number. The cooling tower could consist of one circular structure if inter-bay passageways 41 are not provided. The air supply to the upper deflectors 5 could come from the inter-bay passageway via a circumferential duct with an appropriate inlet restrictor instead of via restrictor 15 located above deflector 5. The inlet to the upper deflectors 5 is shown at the top of the cooling tower in FIG. 4 to illustrate the fact that the upper deflector air does not have to go through the cooling tower. Supplying the air to the upper deflectors from the radial passageways would be more practical in an real station since the heights of deflectors 3 and 5 are exaggerated in FIG. 4 for clarity.

The vortex would be started by temporarily heating the air inside the circle of deflector with heater 83. There are many possible heater arrangements and heat sources. The heated air used to start the vortex should not be too warm because entrainment of ambient air into the free vortex above the cylindrical wall increases with horizontal temperature differential. The preferred startup burner arrangement would be a ring of many small propane burners designed to aspirate lots of air and to produce a warm gas of low temperature. The burners could be oriented close to tangentially to assist vortex formation. Alternatively the hot gas for starting the vortex could be produced in burners located outside the station and brought to the starting heat ring via an underground duct; in which case the starting gas could be furnace flue gas or gas turbine exhaust. Using the startup heater for 10 to 30 minutes should be sufficient to establish the vortex.

The station has two levels of converging air corresponding to lower deflectors 3 and upper deflector 5. The two layers are separated by an annular roof 11 which could be supported on thin columns. The two layers arrangement permit giving the air in the bottom layer less tangential velocity than the air in the layer above. The purpose of giving the lower layer less tangential velocity that than the upper layer is to reduce centrifugal force is to prevent centrifugal force from opposing convergence in the lower layer so that the pressure at lower deflector outlet approaches the pressure at the base of the vortex. The purpose of supplying ambient air to the upper deflector 5 via restrictor 15 is to provide a source of air at higher pressure than the air in the cooling tower to ensure that there is sufficient flow through the upper deflector. The purpose of restrictor 13 is to permit the use of warmed cooling tower air when the pressure in the cooling tower is sufficient to produce the required flow in upper deflector 5. One of the two restrictors 13 and 15 supplying air to upper deflector 5 must be fully kept fully closed to prevent ambient air from entering the cooling tower via the air supply to deflectors 5.

The hump in the center of the station 85 helps turn the converging flow upward. Removing the circulation in the bottom layer makes it possible for the air to converge right up to the center of the vortex. The two layers system increases the effective area of the updraft tube and the quantity of energy which can be produced for a given diameter vortex; upward flow can occur right up to the axis of the vortex and not just in the eyewall annulus thereby increasing the area of the updraft. Radial friction flaps 81 could be used on the floor of the station or on the upper surface of annular roof 11 to further reduce tangential velocity next to these surfaces and enhance convergence. Adjustable radial friction flaps could eliminate the need for two levels of deflectors by reducing the tangential velocity of the air near the floor of the station.

Having a sub-atmospheric pressure in the cooling tower increases the heat transfer between the air and the water because for the same temperature air can hold more water vapor at lower pressure, Michaud (2001). The ratio of the mass flow of air to the mass flow of water in a cooling tower is typically 1:1. A vortex cooling tower should permit increasing the air flow without increasing the cost of the energy required to circulate air. The combination of higher air flow and lower pressure should reduce the cooled water temperature and result in an improvement in efficiency of the conventional part of a thermal power plant beyond the energy produced in cooling tower peripheral turbines 61. The spraying of the air with warm water is the source of the energy in hurricanes, in waterspouts, and in the wet cooling tower vortex engine. Michaud (2001) showed that the maximum pressure reduction in hurricanes can be explained by the air approaching equilibrium with the warm sea surface temperature at the reduced eyewall pressure. Bringing air in equilibrium with 30 C. sea water at reduced pressure is sufficient to produce a central pressure reduction of 15 kPa.

Ambient air 31 enters the cooling tower via turbine 61 and heated air 33 leaves the cooling via lower deflector 3. A parallel stream of air 32 and 34 enters the arena via restrictor 15 and upper deflector 5 without being heated. The two streams are seperated by annular roof 11 as they enter the arena. The combined streams turn upward as they approach the center of the station and spiral upwards as they rise 35 forming the vortex 37. The lower 3 and upper 5 deflectors are adjusted so that the lower layer has less circulation than the upper layer.

The vortex engine would be provided with a state of the art control system from which the position of restrictors and remotely adjustable deflectors and other control valves could be manipulated. The system would have sophisticated instrumentation to measure: pressure, differential pressure, temperature, humidity, air flow direction and velocity. There could be observation post at the inner end of a some of the interbay passageways and a radial observation tunnel under the floor of the station.

Figure 5:
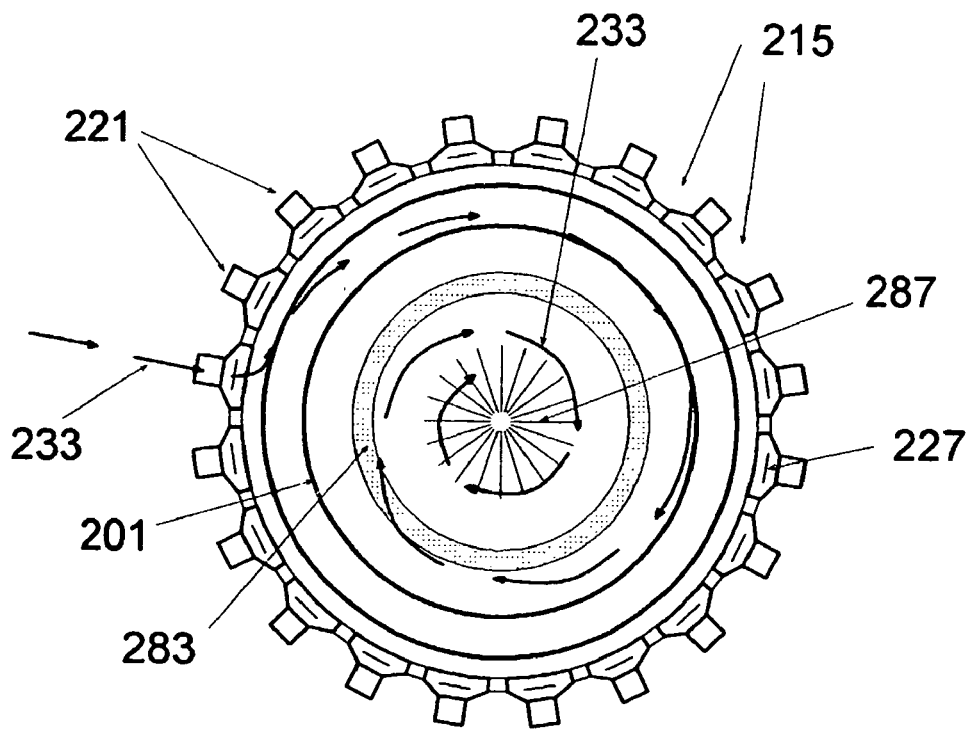
Figure 6:
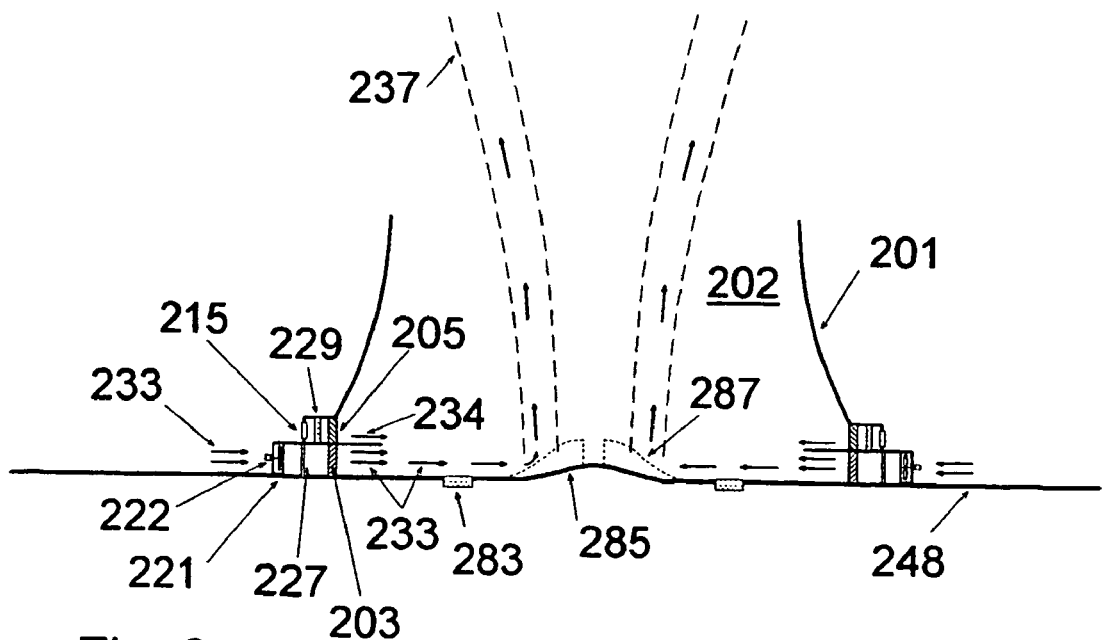

The CAPE of surface air is often sufficient to produce a vortex without heat addition. Under such conditions, increasing the heat content of the rising air may not be desirable and could make the vortex more difficult to control. FIGS. 5 and 6 show a vortex generator without the continuous heat mean and illustrates other alternative features. Cylindrical wall 201 curves inward like a short hyperbolic cooling tower, using an inward curving wall has the advantages of reducing entrainment of air from above the wall into the base of the vortex and could be less costly for large stations.

Lower air 233 enters the station via turbine 221, which drives generator 222, and goes through a diffusing screen 227 before being ducted to lower deflector 203. Upper air enters via restrictor 215 goes through diffuser 229 and enters the arena via upper deflector 205. The vortex 237 is started by burning fuel in fuel ring 283. Radial friction flaps 287 near the central hump 285 reduce the tangential velocity and encourage convergence in the center of the vortex.

Alternative Embodiments

The vortex can have clockwise or counter-clockwise rotation; a vortex engine could be designed to produce a vortex with clockwise or counter-clockwise rotation or both. The primary direction of rotation for which the station is designed will be called the positive direction. Adjustable deflectors would facilitate control, but a large number of adjustable deflectors would be very expensive. Combinations of fixed deflectors could be used as an alternative to adjustable deflectors. In FIG. 4, deflectors 3 and 5 could have fixed positive direction while deflectors 43 and 45 could have fixed negative orientation, the net circulation of the air flowing in the arena could be reduced by restricting the flow to deflectors with positive orientation and opening the flow to deflectors with negative orientation. It is not necessary the that the air flow through all the cooling bays be the same or that all cooling bays be in use. Fixed deflectors 3 and 5 could be oriented close to tangentially on a few the bays used for startup and more radially on the other bays.

The velocity at the outlet of a restriction or deflector is proportional to the square of the differential pressure across the restriction or deflector. A differential pressure of 5.7 kPa across a restrictor produces outlet velocity of 100 m/s; a differential pressure of 0.06 kPa produces an outlet velocity of 10 m/s. The open area of the restrictors can be smaller than area of the restrictor because the differential pressure across the restrictor is larger. Using combinations of fixed deflectors could reduce the number and area of the adjustable surfaces by 50 to 80%.

In dry climates, dry cooling tower could be more appropriate than wet cooling towers; dry cooling tower would have the advantage of eliminating water consumption. The heat transfer mechanism in dry cooling towers is similar to that in dust-devil where the converging air comes in intimate contact with the hot soil and with hot sand spray. In arid climates, wet natural draft cooling tower do not work as well as forced draft cooling towers because the evaporative cooling is so high that it tends to reduce the temperature of the air. For the same reason, vortex engines with dry cooling tower might be preferable in dry climates.

While the invention has been described with reference to specific embodiments, modifications and variations of the invention may be constructed without departing from the scope of the invention defined in the claims.

DESCRIPTION OF OPERATION

Start Up Procedure for the Preferred Embodiment with Remotely Adjustable Deflectors 1. Position lower inlet deflectors 3 to give the converging air maximum tangential deflection.
2. Position upper inlet deflectors 5 to give the converging air maximum tangential deflection. Close both air inlets restrictors 13 and 15 to upper deflector 5.
3. Ensure that radial air passages 44, 46 are close.
4. Open the turbine 61 inlet nozzles and the turbine bypass damper 25.
5. Fill cooling tower basin 55, start the water circulation, start warming the circulating water with waste process heat.
6. Gradually increase central startup heat source 83.
7. Monitor central pressure and air velocity, control the vortex intensity by reducing firing, by decreasing the deflection 3, and by restricting the flow at the cooling tower inlet 21, 25.
8. Gradually open ambient air inlet to upper deflector 5 via louver 15.
9. Gradually move lower inlet deflectors 3 towards the radial direction to reduce the pressure in the cooling tower.
10. Close the turbine bypass restrictor 25 and turbine 61 inlet nozzles as necessary to keep the velocity in the cooling bay from getting too high.
11. Reduce the deflection at lower deflectors 3 and upper deflectors 5 and restrict the flow to upper and lower deflector.
12. The convective vortex could tend to rapidly increase in intensity because a large vortex will keep rising until the rising air reaches its level of neutral buoyancy. The base pressure reduction is proportional to the height of the vortex. At an upward velocity of 10 m/s a vortex could reach a height of 10 km in 20 minutes.
13. Gradually increase the temperature and flow of the warm cooling water entering the cooling tower.

Stopping Procedure.

1. Gradually restrict the flow to the turbine at the turbine inlet nozzles, restrict the flow of air to the upper deflector with louvers 15, orient upper and lower deflectors 3 and 5 as necessary to reduce the tangential velocity of the converging air to zero, use negative orientation on some deflectors if necessary.
2. For a station with fixed deflectors restrict the flow to positive orientation deflectors 3 and 5 and open the open the flow to negative orientation deflectors 43 and 45.
3. Reduce or stop the cooling water circulation.
4. In an emergency, douse the vortex with cold water from remote operated fire hydrants located at the inner end of radial passageways.

What I claim as my invention is:

1. A device for producing a vortex similar to one of a group consisting of dust-devils, waterspouts, and tornadoes, comprising an impervious vertical axis cylindrical wall of roughly circular cross section,
    (a) wherein said wall is open at the upper end,
    (b) wherein said wall has a plurality of air entries at the lower end,
    (c) wherein the height of said wall is substantially less than the height of said vortex,
    (d) wherein the height of said air entries is substantially less than the height of said wall, (e) wherein a plurality of deflectors in said air entries direct the air entering the circular wall away from the radial direction and towards the tangential direction, (f) wherein said deflector have a predetermined orientations relative to a line extending from said deflector to the axis of the cylindrical wall, (g) wherein the quantity of air entering said circular wall is controlled with a plurality of adjustable restrictors located upstream of said deflectors, (h) wherein the rotation of the air entering said circular wall is controlled by using said restrictors to channel the air through deflectors with the appropriate orientation, (i) wherein the vortex is started by temporarily heating the air in said circular wall using fuel as the primary heat source, whereby said vortex is used to produce mechanical energy, to produce electrical energy, to produce precipitation, or to improve the performance an associated cooling tower.

2. A device per claim 1, wherein fuel burners located within said circular wall provide temporary heating to start said vortex.

3. A device per claim 1, wherein there are conduit means for bringing heated gaseous fluid within said circular wall to provide temporary heating to start said vortex, wherein said heated gaseous fluid is produced in a fired apparatus located outside said device; and wherein said heated gaseous fluid is selected from the group consisting of heated air, steam, furnace flue gas, and gas turbine exhaust.

4. A device per claim 1, wherein said deflectors have adjustable orientations.

5. A device per claim 1, wherein said deflectors have fixed orientations.

6. A device per claim 1, wherein said device is divided into a plurality of airtight sectors, wherein the flow of air into said sector is controlled with restrictors located at the upstream end of said sector, and wherein the there is a set of deflectors with a predetermined orientation located at the downstream end of said sector.

7. A device per claim 1, wherein the air entering the circular wall is unheated ambient air, and wherein the heat content of ambient air is sufficient to sustain the vortex once established.

8. A device per claim 1, wherein the heat content of the air entering the circular wall is increased in a continuous heat transfer mean located upstream of the deflectors.

9. A device per claim 8, wherein the heat source for said continuous heat transfer mean is selected from the group consisting of waste heat from power plants, waste from other industrial processes, and other low temperature heat sources.

10. A device per claim 8, wherein the heat source for said continuous heat transfer mean is a natural source of heat selected from the group consisting of warm sea water, warm fresh water, warm solar heated brine, and warm brine.

11. A device per claim 8, wherein said continuous heat transfer means is selected from one of the groups consisting of wet cooling towers, dry cooling towers, and other heat exchangers.

12. A device per claim 11, wherein the cooling tower consists of a plurality of cooling tower bays with a plurality of passageways between said bays, wherein each bay and each passageway is part of an airtight duct between an upstream set of restrictors and downstream set of deflectors.

13. A device per claim 11, wherein the cooling tower is made up of a continuous circular ring divided into a plurality of sectors, wherein each bay is part of an airtight duct between an upstream set of restrictors and a downstream set of deflectors.

14. A device per claim 11, wherein the water circuit consist of two concentric circular rings, wherein the water in the inner ring is warmer than the water in the outer ring, whereby counter flow heat exchange is used to improve heat usage.

15. A device per claim 1, wherein a plurality of peripheral turbines located upstream of the deflectors are used to produce mechanical energy.

16. A device per claim 15, wherein the peripheral turbines drive a plurality of electrical generators to produce electricity.

17. A device per claim 15, wherein the turbine have inlet nozzles, wherein said inlet nozzles are used to produce kinetic energy for capture by the turbine blades and wherein the said inlet nozzles are the restrictor mean for controlling the quantity of air entering said device.

18. A device per claim 15, wherein the peripheral turbines have fixed nozzles and rotating blades like the expander stages of axial flow gas turbines.

19. A device per claim 1, wherein there is a single level of deflectors at the lower end of the circular wall.

20. A device per claim 1, wherein there are two levels of deflectors at the lower end of the circular wall to provide independent control of the quantity and direction of the air in a lower and an upper layer.

21. A device per claim 20, wherein the lower deflectors direct the air more radially than the upper deflectors to prevent centrifugal force from opposing convergence in the lower layer, so that the pressure upstream of the lower deflectors tend to approach the pressure at the base of the vortex.

22. A device per claim 20, wherein there are damper means of selecting whether the air flowing in the upper set of deflectors is air that has gone through the heat exchanger mean.

23. A device per claim 20, wherein there is an impervious annular roof with a circular opening at its center to separate the lower and the upper air layers.

24. A device per claim 1, wherein friction flaps, located on the floor of the area enclosed by the circular wall, are used to reduce circulation and to reduce the centrifugal force in the boundary layer; whereby convergence in the bottom layer of air is enhanced.

25. A device per claim 24, wherein the height of said friction flaps is a function of distance from the center of the circular wall.

26. A device per claim 1, wherein the diameter of the cylindrical wall varies with height.

27. A device per claim 1, wherein there is a hump in the center of the floor of the circular wall, whereby said hump helps keeps the vortex in the center of the cylindrical wall.

28. A device per claim 1, wherein the majority of the deflectors are oriented to produce counter-clockwise rotation wherein some of deflectors produce clockwise circulation, wherein the net circulation of the air entering the circular wall can be reduced by restricting the flow to the sectors producing counter-clockwise rotation and opening the flow to the sector sectors producing clockwise rotation, wherein the vortex can be stopped by reducing the net circulation, and the same for the opposite direction.

29. A device per claim 1, wherein hot gas, selected from a group consisting of furnace flue gas, gas turbine exhaust gas, and industrial waste heat is introduced continuously into the circular wall to enhance the vortex.

30. A device per claim 8, wherein dirty gas, selected from a group consisting of furnace flue gas, gas turbine exhaust gas, and industrial waste heat is injected continuously in the cooling tower, wherein the cooling water circuit is used to remove pollutants from the flue gas, and wherein pollutants are removed from the water circuit during water treatment.

31. A method of initializing and controlling a vortex similar to one of a group consisting of dust-devils, waterspouts, and tornadoes comprising:

(a) providing the air converging towards the base of said vortex a tangential component of velocity by having the air enter a roughly circular area via generally tangentially oriented entries, preventing ambient wind from disturbing the vortex with a vertical axis circular wall, (c) controlling the quantity of air entering the circular area with restrictors located upstream of the tangential air entries, (d) ensuring that the air converging towards the base of said vortex has sufficient heat content to be buoyant as it rises through the ambient air by one of a group consisting of using air with a naturally occurring high heat content and providing heat to the air in heat exchange devices located upstream of the tangential entries, ensuring convergence towards the center of the circular wall by providing an annular roof with a circular opening in its center, wherein energy may be produced via turbines located upstream of the tangential entries, wherein the said turbines do not come in direct contact the said vortex, and wherein the energy is derived mainly form the heat content of the rising air and not from the kinetic energy of pre-existing wind.

* * * * *